United States Patent [19]

Suzuki et al.

[11] Patent Number: 4,998,285

[45] Date of Patent: Mar. 5, 1991

[54] CHARACTER RECOGNITION APPARATUS

[75] Inventors: Kaoru Suzuki; Shuichi Tsujimoto, both of Yokohama, Japan

[73] Assignee: Kabushiki Kaisha Toshiba, Kawasaki, Japan

[21] Appl. No.: 321,268

[22] Filed: Mar. 9, 1989

[30] Foreign Application Priority Data

Mar. 11, 1988 [JP] Japan .................................. 63-56221
Mar. 26, 1988 [JP] Japan .................................. 63-72735
Oct. 27, 1988 [JP] Japan .................................. 63-269365

[51] Int. Cl.$^5$ ............................................. G06K 9/00
[52] U.S. Cl. ......................................... 382/9; 382/18; 382/16
[58] Field of Search ...................... 382/9, 18, 7, 25, 36

[56] References Cited

U.S. PATENT DOCUMENTS

| | | | |
|---|---|---|---|
| 4,251,799 | 2/1981 | Jih | 382/18 |
| 4,481,665 | 11/1984 | Ota | 382/9 |
| 4,528,692 | 7/1985 | Umeda et al. | 382/9 |
| 4,558,461 | 12/1985 | Schlang | 382/9 |
| 4,562,594 | 12/1985 | Bednar et al. | 382/9 |
| 4,594,732 | 6/1986 | Tsuji | 382/18 |

OTHER PUBLICATIONS

8th International Conference on Pattern Recognition, vol. 2, pp. 1218-1220, "The Use of Global Context in Text Recognition"; Jonathan J. Hull; Oct. 27-31, 1986.

Primary Examiner—David K. Moore
Assistant Examiner—Yon Jung
Attorney, Agent, or Firm—Oblon, Spivak, McClelland, Maier & Neustadt

[57] ABSTRACT

Each row of characters is extracted from document data representing rows of characters by a character row extracting circuit. The characters are separated from the row by a character separating circuit. In a reference line detecting circuit two histograms are formed, one pertaining to the upper sides of the rectangles bordering the extremities of the characters, and the other pertaining to the lower sides of these rectangles. Two reference lines are defined from the histogram. The characters are sorted intoseveral categories, in accordance with their sizes and the positions they take with respect to the reference lines. The pattern of each character is compared with the dictionary patterns of the same category.

16 Claims, 14 Drawing Sheets

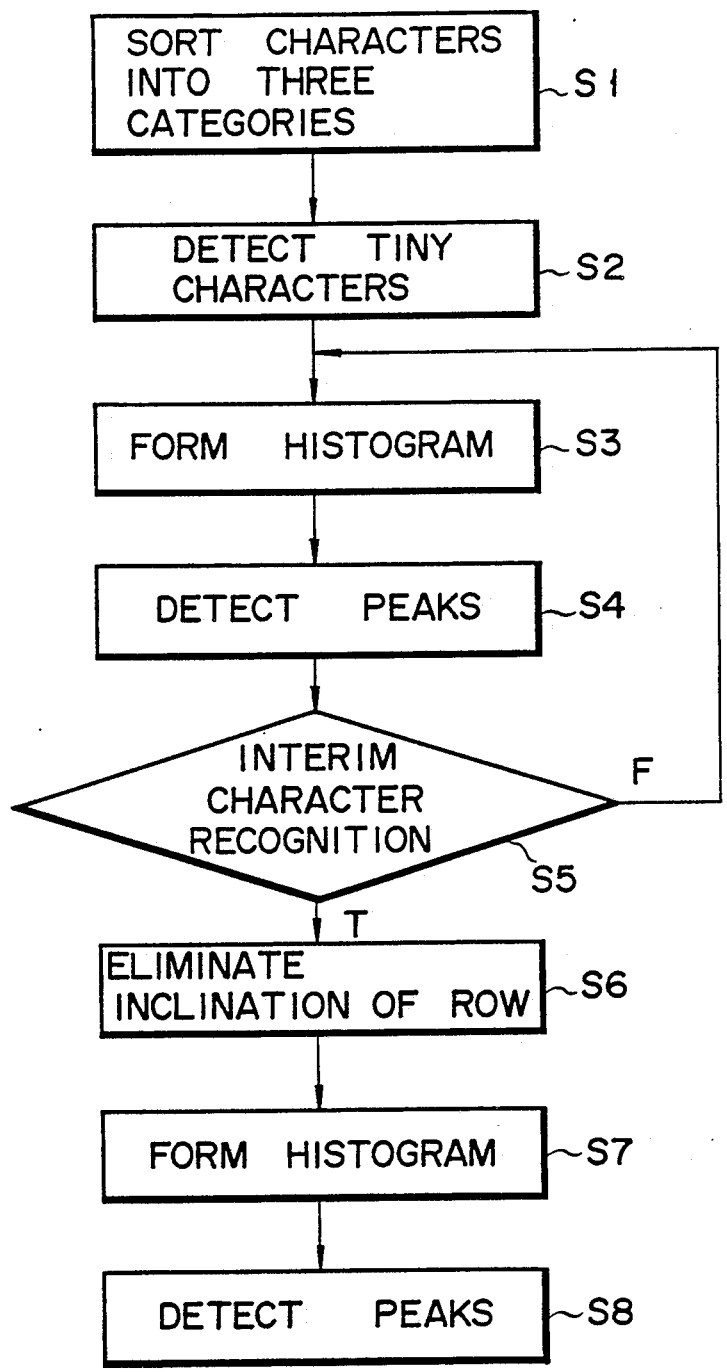
F I G. 5

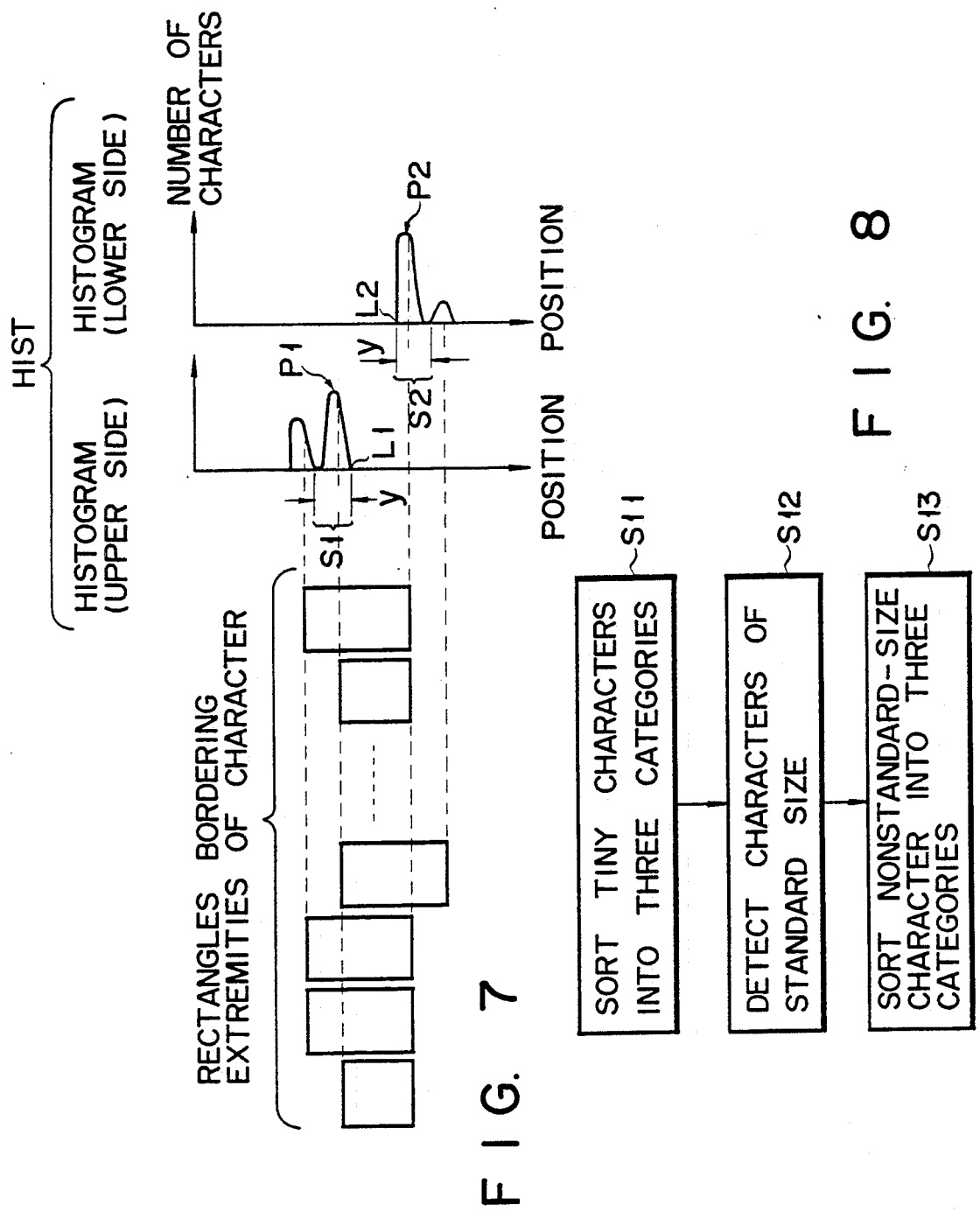

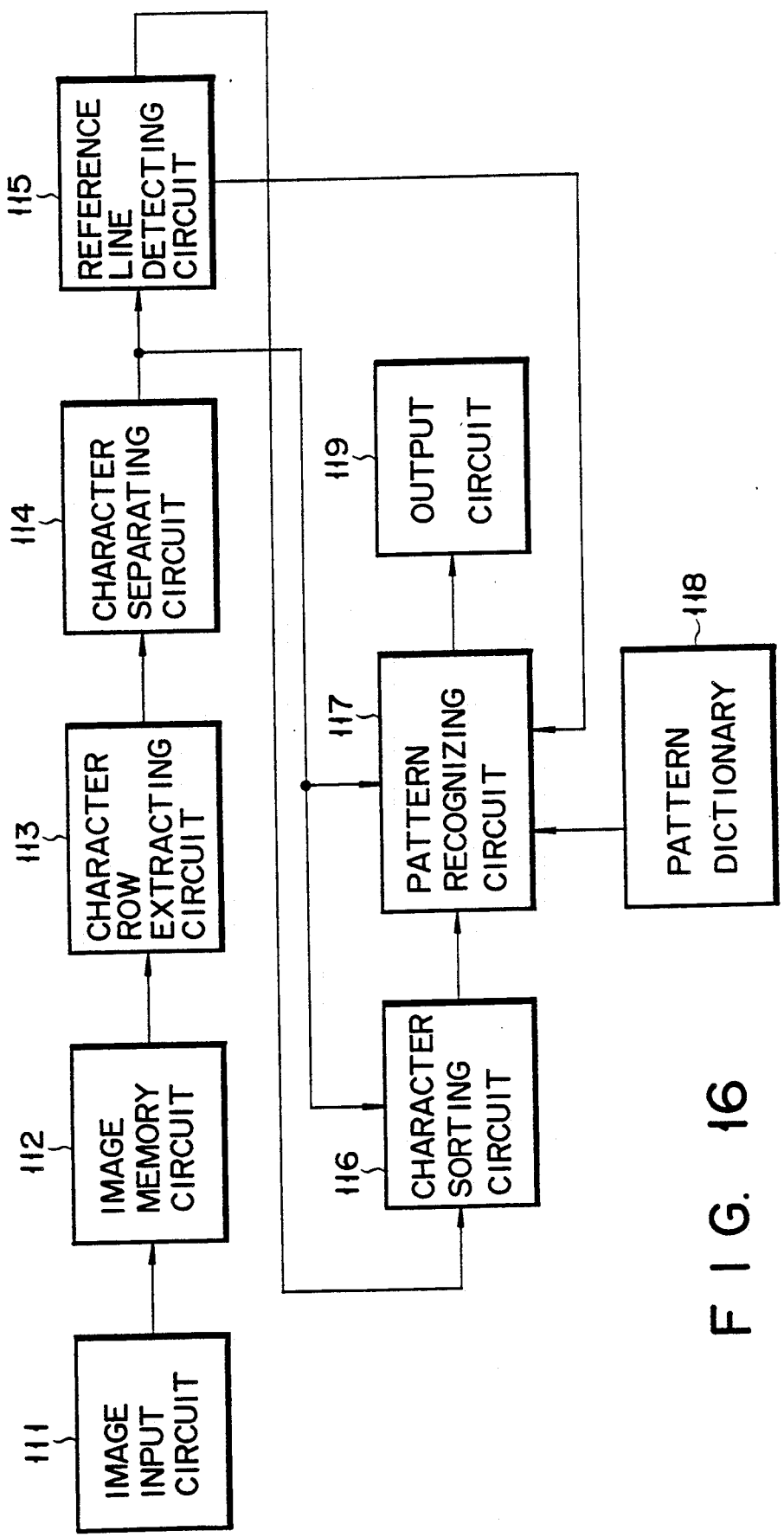
F I G. 16

CHARACTER RECOGNITION APPARATUS

BACKGROUND OF THE INVENTION

1. Field of the Invention

The present invention relates to an apparatus for reading the rows of characters of a document, and recognizing each of the characters of any row. More particularly, it relates to a character recognition apparatus for recognizing characters in accordance with the data representing sizes, positions and other attributes of the characters.

2. Description of the Related Art

A character reading apparatus for automatically reading characters from documents comprises a character recognition apparatus which recognizes each of the characters by virtue of pattern recognition techniques. The character recognition apparatus performs pattern matching processing; it compares the pattern of each character with the dictionary patterns of characters. With the character matching processing it is impossible to distinguish some capital letters from small letters, for example, "S" from "s," or "C" form "c". Consequently, the accuracy of character recognition is not sufficiently high.

A method of increasing the accuracy of character recognition is disclosed in Japanese Patent Disclosure No. 62-187088. In this method, every time the patterns of a character of each row have been recognized, the data representing horizontal reference lines are generated from the heights of the large and small of the same character, if any in the row of the characters, and the characters are sorted into several categories in accordance with their sizes, with reference to the reference lines data, thereby distinguish the large characters from the small ones.

Certainly, this method helps to enhance the accuracy of character recognition. However, since the reference line data cannot be acquired until the patterns of the characters of one row are recognized, and the patterns of the characters of any category must be compared with the dictionary patterns. Thus, the cost of the pattern matching process is just as high as in the conventional character recognition apparatuses.

SUMMARY OF THE INVENTION

Accordingly, an object of the present invention is to provide a character recognition apparatus which can perform the pattern matching process at a low cost.

Another object of this invention is to provide a character recognition apparatus which can sort characters into several categories with high accuracy, thereby increasing the accuracy of character recognition.

According to the present invention, characters are recognized in the following way. First, a row of characters is separated from image data representing rows of characters. Then, rectangles bordering the extremities of these characters are defined. Further, a histogram is prepared which shows the positions of the upper and lower sides of these rectangles. Data showing reference lines is generated from the histogram. The characters are sorted into several categories in accordance with the reference lines, more specifically the positions which the characters take with respect to the reference lines. Finally, the characters are recognized in accordance with their categories and the dictionary character patterns.

That is, in the present invention, characters are recognized in accordance with not only their sizes but also their positions with respect to two or more sublines.

As has been pointed out, the reference line data is generated from the histogram representing the positions of the upper and lower sides of rectangles bodering the extremities of these characters. This method of generating the reference line data is less complex and can therefore be performed faster than the method used in the conventional character recognition apparatus, i.e., the pattern matching process. It serves to increase the speed of character recognition. Further, since the reference lines are defined by the heights of almost all characters forming each row, not by the heights of the large and small of the same character as in the conventional apparatus, they are correct. Thus, the characters can be sorted from their sizes and also the positions the characters assume with respect to the reference lines. Due to this specific sorting, a large character can be distinguished from a small one of the same pattern.

According to the present invention, the characters of each row read from a document are sorted into several categories, before the pattern matching process. Hence, to recognize a character of any category it suffices to compare the pattern of the character with the dictionary patterns of the characters of the same category as the character to be recognized. This helps to reduce the time for the pattern matching process, and also to enhance the accuracy of character recognition.

Since at least two reference lines are defined by the specific method described above, the characters can be sorted in accordance not only with their position, but also with their sizes, with reference to the distance between these reference lines.

Further, as has been pointed out, when tiny characters such as punctuation marks are included in a a row of characters, the reference lines are defined by the histogram representing the positions of the upper and lower sides of rectangles bordering the extremities of only the other characters of the row. In other words, tiny characters, if any are in the row, are not taken into account in defining the reference lines. Therefore, the reference lines can be defined more correctly than otherwise, which ultimately contributes to the accuracy of character recognition.

BRIEF DESCRIPTION OF THE DRAWINGS

FIG. 5 is a flow chart explaining the operation which is performed by the reference line detecting circuit incorporated in the apparatus;

FIGS. 6 and 7 are diagrams explaining how a histogram is formed which represents the positions of the upper and lower sides of the rectangles bordering the extremities of the characters of one row, and how the characters are sorted into several categories in accordance with the histogram;

FIG. 8 is a flow chart representing the operation which is performed by the character sorting circuit incorporated in the apparatus;

FIG. 16 is a block diagram showing still another character recognition apparatus according to the present invention;

DETAILED DESCRIPTION OF THE PREFERRED EMBODIMENTS

Figure 1:
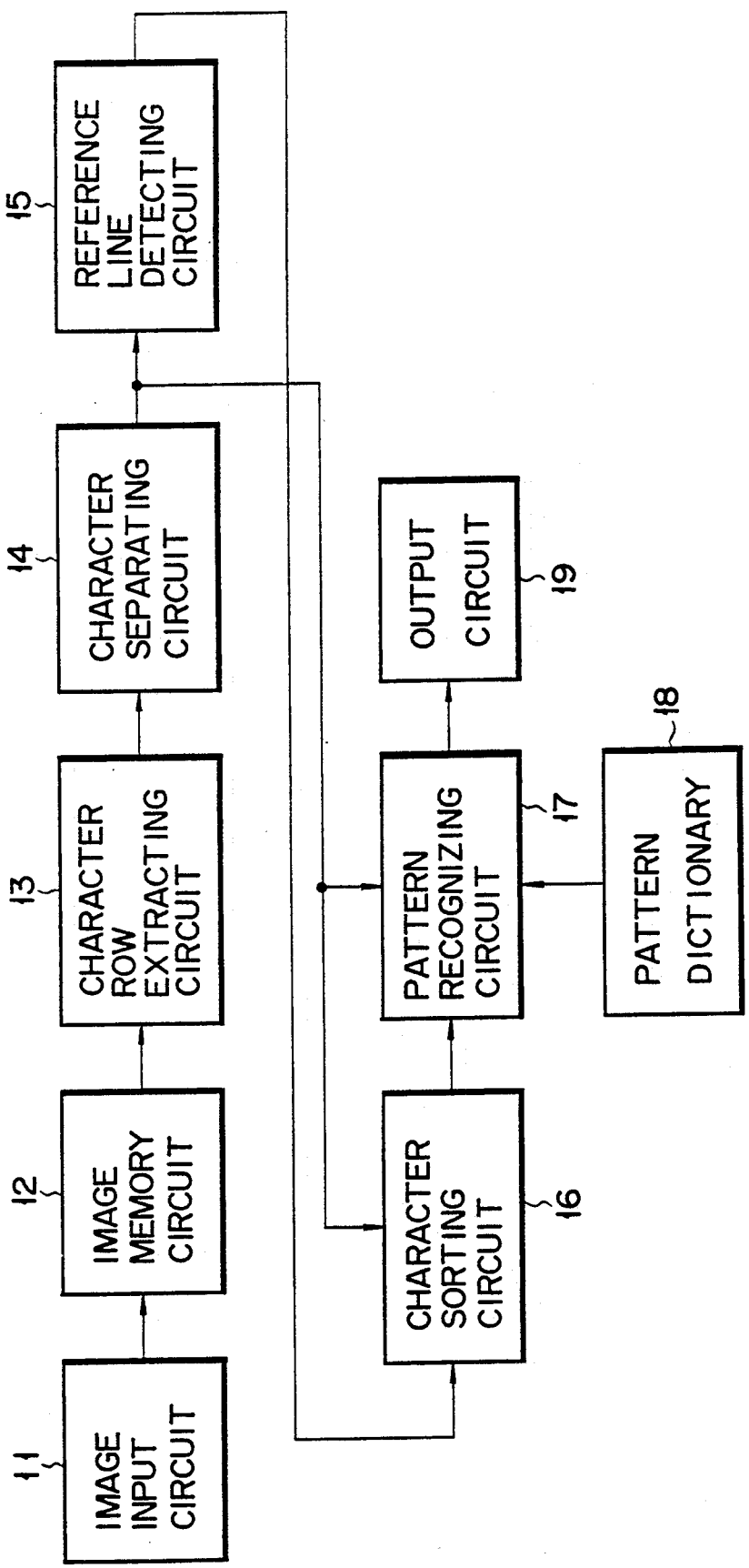
FIG. 1 is a block diagram showing a character recognition apparatus according to the present invention.

FIG. 1 is a block diagram showing a character recognition apparatus according to the present invention. As this figure shows, the apparatus comprises an image input circuit 11, an image memory circuit 12, a character row extracting circuit 13, a character separating circuit 14, a reference line detecting circuit 15, a character classifying circuit 16, a pattern recognizing circuit 17, a pattern dictionary 18, and an output circuit 19.

The image input circuit 11 comprises a scanner such as a line image sensor. It reads a document and outputs the document image data representing the document. The output of the circuit 11 is connected to the image memory circuit 12. The memory circuit 12 stores the document image data output from the image input circuit 11. The output of the memory circuit 12 is connected to the character row extracting circuit 13. The circuit 13 extracts each row of characters from the document image data, in accordance with, for example, the black-run length or the white-run length of the document image data. The output of the circuit 13, i.e., the data representing the row of characters, is supplied to the character separating circuit 14. The circuit 14 separates the characters, one by one, from the row extracted by circuit 13, and outputs data items representing the patterns of these characters and also data items showing the rectangles bordering the extremities of the characters. The data items are input to reference line detecting circuit 15, character sorting circuit 16, and pattern recognizing circuit 17. The circuits 13 and 14 can be of the types disclosed in U.S. Pat. No. 4,461,027.

The reference line detecting circuit 15 detects or defines reference lines from the data output by the circuit 14 representing the rectangles bordering the extremities of the characters of each row. The character sorting circuit 16, which is coupled to the reference line detecting circuit 15, sorts the characters of the row into several categories in accordance with the sizes of the rectangles and also with the positions the rectangles take with respect to the reference lines defined by the circuit 15. The output of the circuit 16 is connected to the pattern recognizing circuit 17. The outputs of the character separating circuit 14, and that of the pattern dictionary 18 are also connected to the circuit 17. The pattern dictionary 18 stores the dictionary patterns of characters sorted in said categories. The pattern recognizing circuit 17 compares the character pattern represented by each data item supplied from the character separating circuit 14, with the dictionary character patterns of the same category which have been read from the pattern dictionary 18, and outputs a data item representing the dictionary pattern which is most similar to the character pattern supplied from the character separating circuit 14. The data item output by the circuit 17 is supplied to the output circuit 19.

Figure 2:
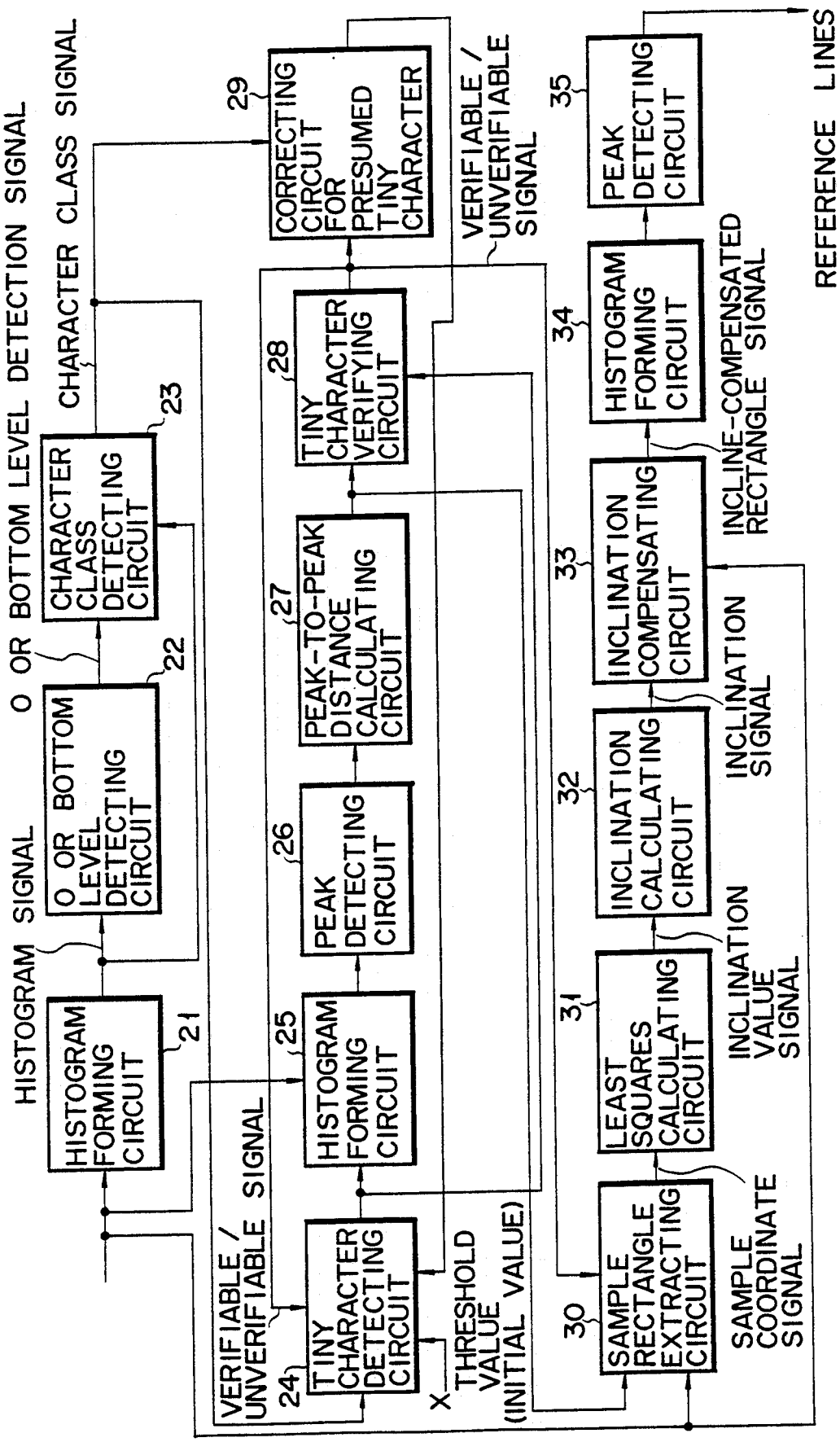
FIG. 2 is a block diagram illustrating the reference line detecting circuit incorporated in the apparatus shown in FIG. 1.

The reference line detecting circuit 15 will now be described in detail, with reference to FIG. 2. As this figure shows, the circuit 15 comprises several components. The data items, which have been output by the character separating circuit 14 and represent the patterns of the characters of each row, are supplied to a histogram forming circuit 21. The circuit 21 forms a histogram of the row of characters, from the data items output by the character separating circuit 14. The histogram signals, representative of the histogram are supplied to a circuit 22 for detecting the zero level or the bottom level of the histogram. The circuit 22 outputs a signal showing the zero or bottom level to a character class detecting circuit 23. The circuit 23 detects the distribution of the classes of characters of different heights and widths from the histogram signals output by the circuit 21 and the zero-level or bottom-level signal output by the circuit 22. The data representing the character class is supplied to a tiny character sorting circuit 24. The circuit 24 detects the characters which are recognized as tiny, and supplies data items representing the tiny characters, to a histogram forming circuit 25. The histogram forming circuit 25 forms a histogram from the data items output from the circuit 24, and supplies signals representing this histogram to to a peak detecting circuit 26. The circuit 26 detects the peaks of the histogram from the signals output from the circuit 25. A peak-to-peak distance calculating circuit 27, which is connected to the output of the peak detecting circuit 26, calculates the distance between the peaks of the histogram, and supplies the data representing this peak-to-peak distance to a tiny character verifying circuit 28. The data items output by the circuit 24 representing tiny characters are also supplied to the circuit 28. The circuit 28 compares the upper extremity of each data with the peak-to-peak distance, thereby determining whether or not the character is truly a tiny one, and outputting a true signal or a false signal to a correcting circuit 29. When the circuit 29 receives a false signal, it generates a data item representing a newly presumed tiny character. This data item is supplied to the tiny character detecting circuit 24. The circuit 24 detects a tiny character in accordance with the data item output by the circuit 29. On the other hand, when the circuit 29 receives a true signal, it supplies this signal to a sample rectangle extracting circuit 30. The data items representing the rectangles bordering the extremities of the characters are also supplied to the circuit 30. Further, the data showing the peak-to-peak distance is supplied from the circuit 27 to the circuit 30. The circuit 30 detects the rectangle whose height is the most similar to the peak-to-peak distance, and outputs sample coordinate signals representing the upper and lower sides of this rectangle. These sample coordinate signals are supplied to a circuit for calculating least squares. The circuit 31 performs the least squares method, thereby obtaining lines passing the sample points on the upper and lower sides of the rectangle. Further, the circuit 31 outputs data showing the inclinations of these lines to an inclination calculating circuit 32. The circuit 32 calculates the average inclination of these lines, and outputs the data showing the average inclination which is regarded as the inclination of the row of characters. This data is supplied to an inclination compensating circuit 33. The circuit 33 corrects the data items representing the positions of the rectangles, in accordance with the data showing the inclination of the row, and supplies data items showing the corrected positions of the rectangles, to a histogram forming circuit 34. The circuit 34 forms histograms pertaining to the upper sides and lower sides of the rectangles whose positions have been corrected, and supplies histogram signals to a peak detecting circuit 35. The circuit 35 detects the peaks of the histogram signals, and outputs the data items representing these peaks as data showing the position of a reference line.

Figure 3:
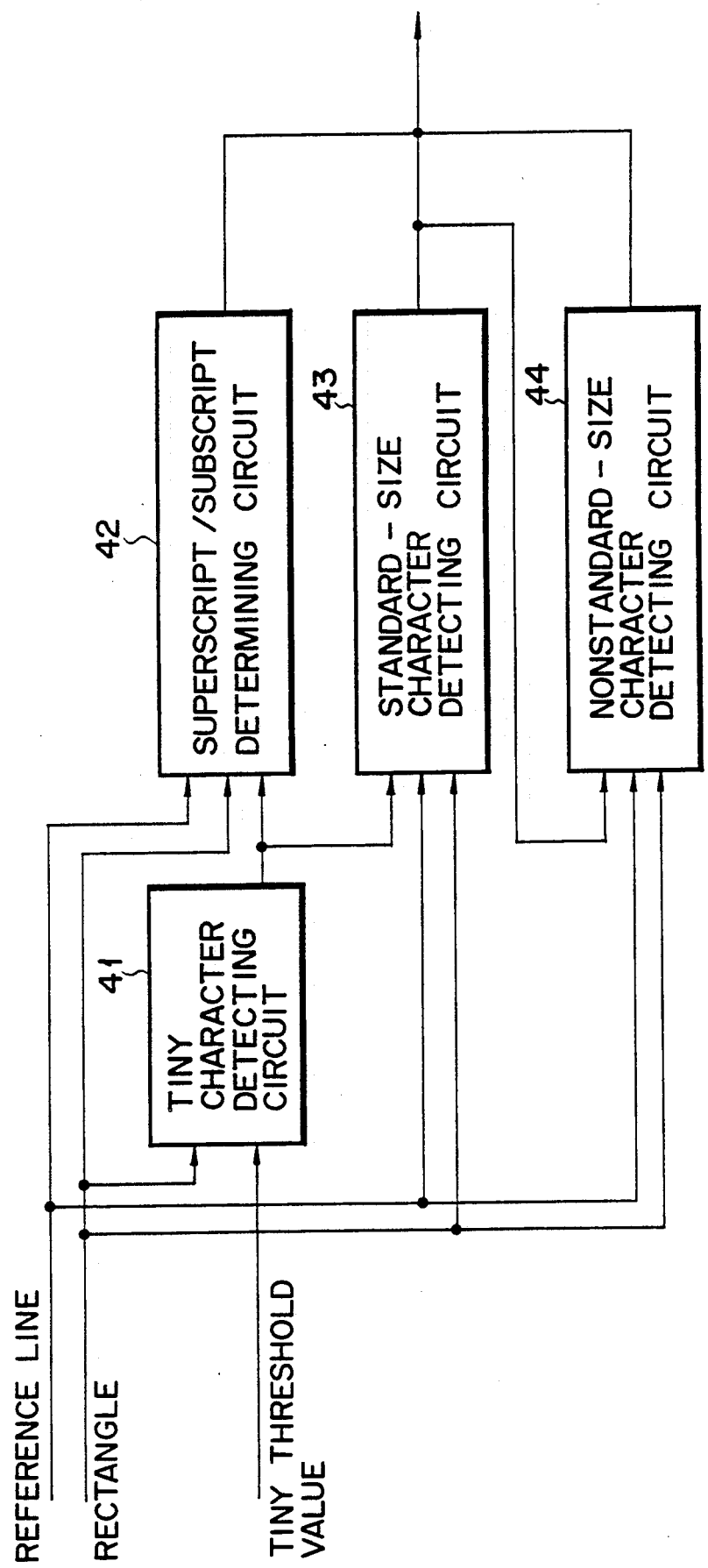
FIG. 3 is a block diagram showing the character sorting circuit incorporated in the apparatus.

The character sorting circuit 16 will be described in greater detail, with reference to FIG. 3. As is shown in this figure, the circuit 16 comprises a tiny character detecting circuit 41, a superscript/subscript determining circuit 42, a standard-size character detecting circuit 43, and a nonstandard-size character detecting circuit 44. The circuits 41, 43, and 44 are connected to the output of the character separating circuit 14 and also to the output of the reference line detecting circuit 15. The tiny character detecting circuit 41 detects tiny characters (e.g., ".", "-", or "'") from the characters represented by the data items output from the circuit 14, with reference to the upper and lower reference lines defined by the circuit 15. The superscript/subscript determining circuit 42, which is coupled to the output of the circuit 41, determines whether each tiny character detected by the circuit 41 is superscript or a subscript or a centrally located (central). The standard-size character detecting circuit 43 detects any character (except tiny ones) positioned between the upper and lower reference lines, such as "a", "c", or "z". The nonstandard-size character detecting circuit 44 detect any character (except tiny and standard ones) having a portion projecting above the upper reference line or below the lower reference line, an ascender character (e.g., "A", "B", or "Z", "b", "h", or "t"), a descender character (e.g., "g", "j", or "y"), or a projecting character (e.g., "{", "/", or "}").

More specifically, the character sorting circuit 16 sorts the characters of each row into the following seven categories:

| Size | Position | Category No. |
| --- | --- | --- |
|  | Superscript | 5 |
| Tiny | Central | 7 |
|  | Subscript | 6 |
| Standard |  | 1 |
|  | Ascender | 2 |
| Nonstandard | Descender | 3 |
|  | Projecting | 4 |

Figure 4:
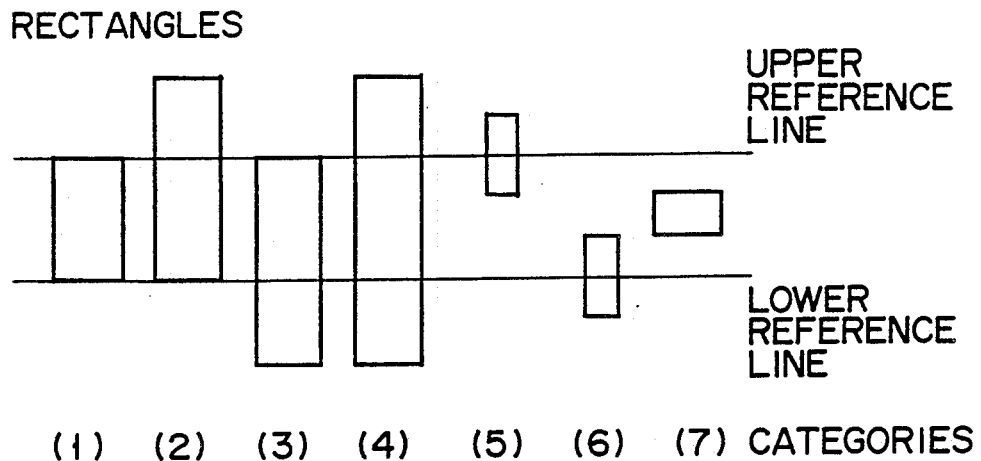
FIG. 4 is a diagram representing various categories of characters which the apparatus shown in FIG. 1 is to recognize.

FIG. 4 shows the positional relationship between the upper and lower reference lines, on the one hand, and the seven rectangles bordering the extremities of the seven characters of these categories 1 to 7. As is evident from this figure, the positions of both reference lines can be determined from the lower and upper sides of the rectangles specific to the characters of categories 1 to 4.

With reference to the flow chart of FIG. 5, it will now be explained how the reference line detecting circuit 15 defines the upper and lower reference lines.

Figure 6:
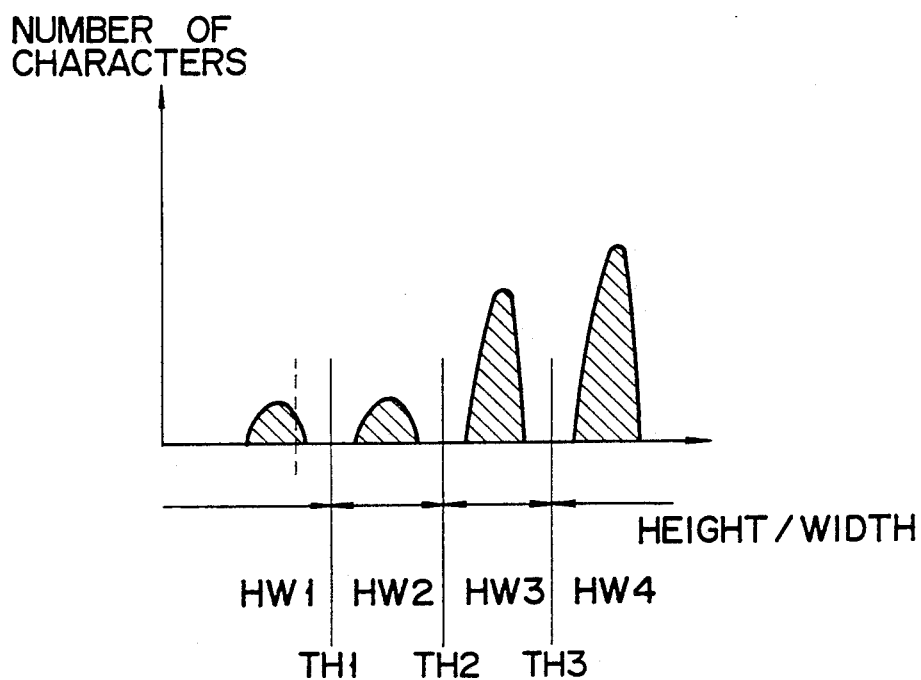

First, in step S1, the data items, which have been output by the character separating circuit 14 and show the patterns of the characters of each row, are input to the histogram forming circuit 21. The circuit 21 forms a histogram of the row of characters, from the data items output by the character separating circuit 14. This histogram shows the heights and widths of the rectangle bordering the extremities of the characters. The histogram signals, representative of the histogram are input to the circuit 22. The circuit 22 detects the zero level or the bottom level of the histogram. The defection signal corresponding to the zero or bottom level is input to the character-class detecting circuit 23. The circuit 23 produces character-class signals representing classes HW1, HW2, HW3, and HW4 (also shown in FIG. 6).

Next, in step S2, the character-class signals (HW1, HW2, HW3, and HW4) are supplied to the tiny character detecting circuit 24. The circuit 24 detects the character class (HW1) corresponding to characters presumed as tiny characters, among classes HW1, HW2, HW3, and HW4. In this case, the circuit 24 determines whether or not each character has a height value which is X% of the height value HW4 (FIG. 6) which represents the height of the largest character in the raw. When the height of the character belonging to one class is less than X% of the maximum height, all characters belonging to the same class are regarded as a tiny one. The height of the largest of the characters which have been detected as tiny ones is stored into the memory incorporated in the tiny character detecting circuit 24 as the threshold height value.

Thereafter, in step S3, the histogram forming circuit 25 forms a histogram from all the histogram signals supplied from the histogram forming circuit 21, except for those signals pertaining to the tiny characters which the circuit 24 have detected in step S2. The histogram thus formed represents the positions of the upper and lower sides of the rectangle bordering the extremities of every character other than the tiny characters. This histogram, HIST, is illustrated in FIG. 7.

In step S4, the peak detecting circuit 26 detects the lower limit L1 of the upper side histogram and the upper limit L2 of the lower side histogram. A region between limits L1 and L1-y is defined as a searchable area S1, while a region between limits L2 and L2+y is defined as a searchable area S2. The maximum peak value P1 is detected from the area S1, while the maximum peak value P2 is detected from the area S2. The signals corresponding to the maximum peak values P1 and P2 are supplied to the peak-to-peak distance calculating circuit 27 from the peak detecting circuit 26.

In step S5, the peak detection signals are supplied to the peak-to-peak distance calculating circuit 27, to obtain a distance between the upper peak of the upper side and the lower peak of the lower side. The distance data is input to the tiny character verifying circuit 28, to verify the tiny characters detected by the tiny character detecting circuit 24. When the input tiny character is not truly a tiny character, the tiny character verifying circuit 28 outputs an unverifiable character signal to the correction circuit 29. This circuit 29 calculates a presumed value of a new tiny character in response to the unverifiable character signal and outputs it to the tiny character detecting circuit 24. This circuit 24 detects the tiny character based on the presumed value.

When the tiny character verifying circuit 28 verifies the input tiny character on the basis of the distance data, the sample rectangle extracting circuit 30 detects a rectangle having a height near to the peak-to-peak distance, and outputs a sample coordinate signal representing the upper and lower positions of the rectangle to the least squares calculating circuit 31.

In step S6, the least squares calculating circuit 31 calculates the inclination of lines passing through the sample points on the upper and lower positions of the rectangle, on the basis of the coordinate signal, to output the inclination values of the lines to the inclination calculating circuit 32. This calculating circuit 32 calculates an average value of the inclination values, to output it to the the inclination correcting circuit 33 as data representing the inclination of the character row. The inclination correcting circuit 33 outputs a correction data for correcting the position data of the rectangle in correspondence with the inclination data output from the inclination calculating circuit 32.

In step S7, the correction data is input to the histogram circuit 34, to obtain a histogram relative to the upper and lower sides of the rectangle, on the basis of the rectangle signals wherein the inclination has been corrected.

In step S8, the peak detecting circuit 35 detects the upper and lower peaks of the histogram formed by the histogram forming circuit 34, and outputs the positions of the detected peaks as position signals representing the reference lines to the character sorting circuit 16.

The character sorting circuit 16 sorts the characters of each row into seven categories, as will be explained with reference to the flow chart of FIG. 8.

First, in step S11, the tiny character detecting circuit 41 detects the tiny characters which have been obtained in step S1, and have a height less than the greatest height, among all tiny characters detected by the circuit 24. The data items representing tiny characters detected by the circuit 41 are input to the superscript/subscript determining circuit 42. The circuit 42 sorts these characters into three categories, the first category being superscripts enclosed by rectangles whose upper sides are above the upper reference line, the second category being subscripts enclosed by rectangles whose lower sides are below the lower reference line, and the third category being central tiny characters enclosed by rectangles positioned between the upper and lower reference lines.

Then, in step S12, the standard-size character detecting circuit 43 detects characters whose heights are nearly equal to the distance between the upper and lower reference lines, and recognizes these characters as being of the standard size.

Finally, in step S13, the nonstandard-size character detecting circuit 44 detects the characters other that those detected in steps S11 and S12, and recognizes these characters as being larger than the standard-size ones. Further, the circuit 44 subtracts the height of that portion of each nonstandard-size character which projects below the lower reference line from the height of that portion of the character which projects above the upper reference line, thus obtaining the difference between these heights. When this difference is positive and has an absolute value greater than a predetermined value, then the character is recognized as an ascender character. When the difference is negative and has an absolute value greater than a predetermined value, then the character is recognized as a descender character. When the difference has an absolute value equal to or less than the predetermined value, whether positive or negative, the character is recognized as a character having two positions projecting above the upper reference line and below the lower reference line, respectively.

Hence, the character sorting circuit 16 sorts the characters of each row into the seven categories (1) to (7), as is illustrated in FIG. 4. The data items representing the categories of the sorted characters are input to the pattern recognizing circuit 17. The data items showing the characters are supplied from the character separating circuit 14 to the circuit 17. The circuit 17 compares the character pattern represented by each data items supplied from the circuit 14 with only those dictionary patterns of the same category that is represented by the data item supplied from the circuit 16. Hence, the circuit 17 need not compare the character pattern supplied from the circuit 14 with all dictionary patterns read from the pattern dictionary 18. This saves much time in performing the pattern-matching process. The pattern dictionary 18 stores the different patterns (or fonts) of the same character, so that any character input to the circuit 17 can be quickly identified.

The line space (i.e., the distance between two adjacent rows of characters) can be determined by the positions of two reference lines of either row. More precisely, the line space is identical to the average of the distances among the upper or lower reference lines of the adjacent rows of characters. Further, from the positions of the reference lines for several adjacent rows of characters, it can be determined whether these rows are spaced apart at regular intervals. When they are spaced at regular intervals, it can be assumed that each of these rows include more characters of one specific category than characters of the other categories. If this is the case, the characters of these rows can be recognized in batch, within a shorter time than in the case where the characters are subjected to the pattern matching, row by row. Moreover, When the reference lines for a row of characters are substantially aligned with those for another row of characters, and the distance between the reference lines for the first row is near equal to the distance between the reference lines for the second row, the characters of these rows can also be recognized in batch, within a shorter time than in the case where the characters are subjected to the pattern matching.

The sorting circuit 16 can be designed to assign two or more categories, not only one category, to each character by adding an attribute or attributes to the character. If this is the case, the pattern recognizing circuit 17 refers to the dictionary patterns of two or more categories, thereby to recognize the character having thus attributes.

A part of a document is usually printed in characters of the same font. The font can be identified in accordance with the categories of the characters, and the identified font can be taken into account in recognizing the characters. Let us assume that the character "t" is classified as an ascender in font A, and as a standard-size one in font B. Then, when the character "t" is sorted as an ascender, it is found to be of font A. In this case, any character that has been recognized as a standard-size one need not be compared with the dictionary pattern of "t" in order to recognize this character. Therefore, the cost of the pattern matching process can be reduced. When the font is already known, then the pattern patching process can be performed more correctly.

In the embodiment described above, one row of character is recognized at a time. Nonetheless, according to the present invention, characters of two or more rows can be recognized at a time.

As has been described, characters are sorted into several categories in accordance with their positions and sizes, before they are recognized. Hence, it suffices to compare the pattern of each character with the dictionary patterns of the same category, whereby the cost of the pattern matching process can be reduced. Further, since the pattern matching process is performed with reference to not only the dictionary patterns, but also the positions and sizes of characters, tiny characters, small characters, and large characters can be distinguished from one another, whereby the accuracy of character recognition is enhanced.

Figure 9:
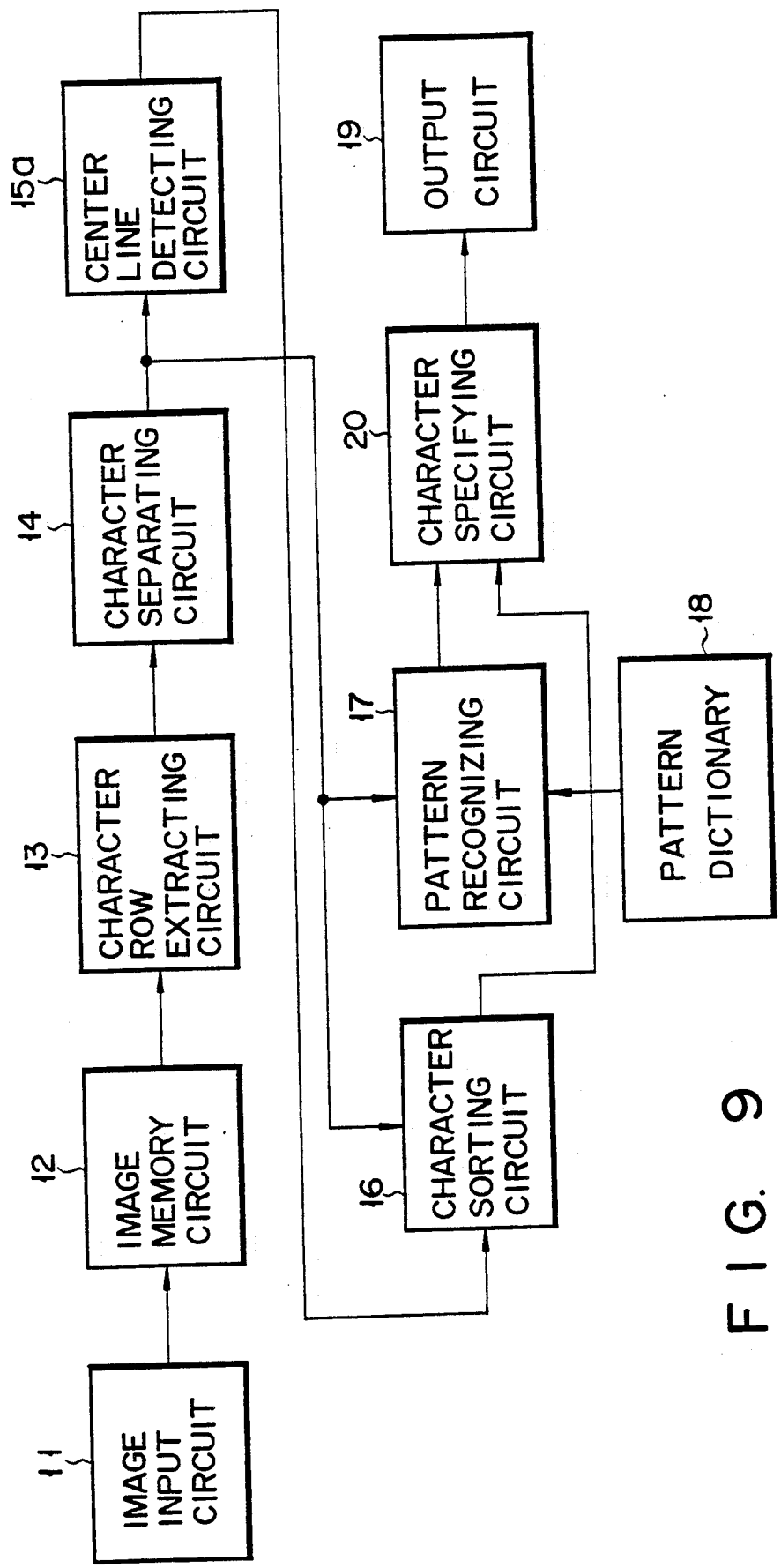
FIG. 9 is a block diagram showing another character recognition apparatus according to the present invention.

With reference to FIG. 9, another embodiment of the invention will be described. This embodiment is characterized in that a single reference line is defined from a row of characters, and the characters are sorted into categories in accordance with their sizes and their positions with respect to this single reference line.

In FIG. 9, the same numerals are used, designating the components identical to those shown in FIG. 1. The components identical to those illustrated in FIG. 1 will not be described in detail.

The document image data output from the circuit 11 is stored into the image memory circuit 12. The character row extraction circuit 13 extracts each row of characters from the document image data read out from the memory circuit 12. The data representing the extracted row of characters is supplied to the character separating circuit 14. The circuit 15 separates the characters, one by one, from the row, and outputs data items representing the patterns of these characters and also data items showing the rectangles bordering the extremities of the characters. These data items are input to center line detecting circuit 15a, character sorting circuit 16, and pattern recognizing circuit 17. The center line detecting circuit 15a detects or defines a reference line (hereinafter called a "center line") from the data output by the circuit 14. The character sorting circuit 16 sorts the characters into the following five categories in accordance with the sizes of the rectangles and the positions these rectangles take with respect to the center line:

| Position | Category |
| --- | --- |
| Superscript | 4 |
| Ascender | 2 |
| Semi-central | 1 |
| Descender | 3 |
| Subscript | 5 |

The pattern recognizing circuit 17 compares the character pattern represented by each data item supplied from the character separating circuit 14, with the dictionary character patterns cf the same category which have been read from the pattern dictionary 18, and output the data item representing the dictionary pattern which is most similar to the character pattern supplied from the character separating circuit 14. The data item output by the circuit 17 is supplied to the output circuit 19.

Figure 10:
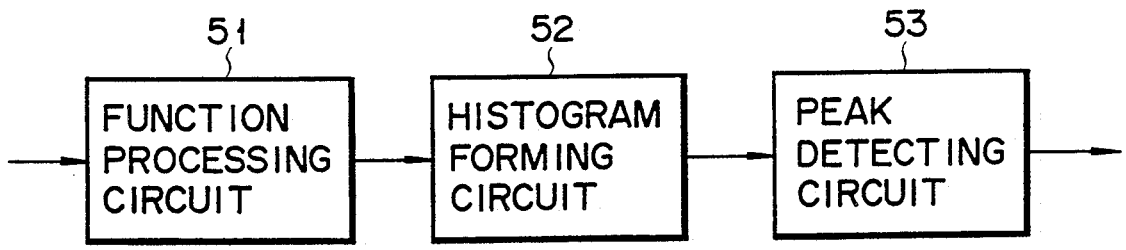
FIG. 10 is a block diagram illustrating the center line detecting circuit incorporated in the apparatus shown in FIG. 9.
Figure 11:
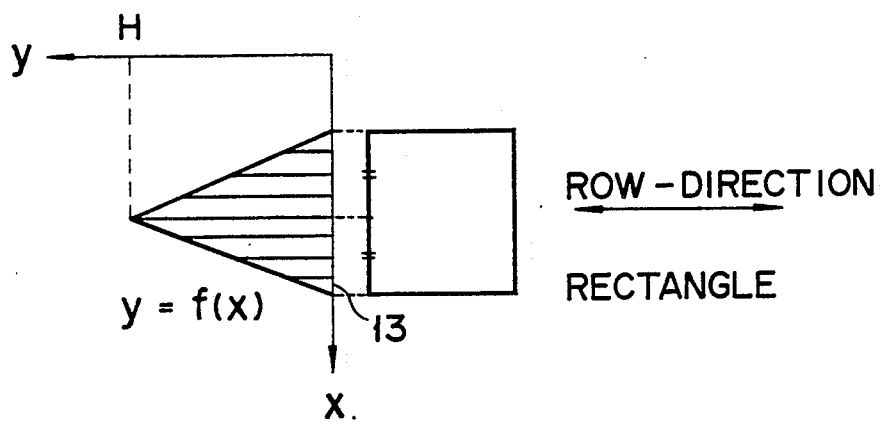
FIG. 11 is a diagram explaining a function-processing operation performed in the circuit shown in FIG. 10.

The center line detecting circuit 15a will now be described in detail, with reference to FIG. 10. As this figure shows, the circuit 15a comprises a function processing circuit 51, a histogram forming circuit 52, and a peak detecting circuit 53. The circuit 51 converts the rectangle bordering the extremities of each character into a function data item representing the position and height of each character. As can be understood from FIG. 11, this function data is a function, $y = f(x)$, which is represented by an isosceles triangle. The base of this triangle is the x axis crossing the row of characters at right angles, and the height of the triangle is H. The function data is input to the histogram forming circuit 52. The circuit 52 adds the function data items output from the circuit 51 showing the positions and heights of the characters, thereby forming a histogram. The peak detecting circuit 53 detects the peak of the histogram, and outputs data representing a center line which is a horizontal line passing the peak of the histogram.

Figure 12:
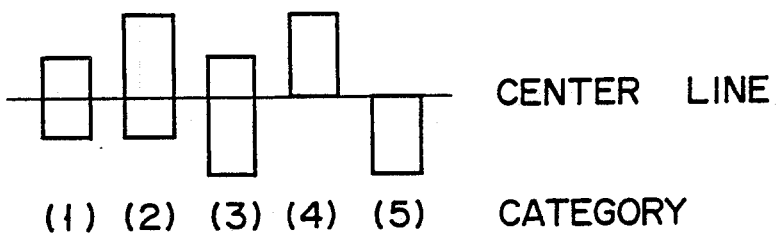
FIG. 12 shows rectangulares of various sizes, which border the extremities of the characters sorted in accordance with their positions with respect to the center line.
Figure 13:
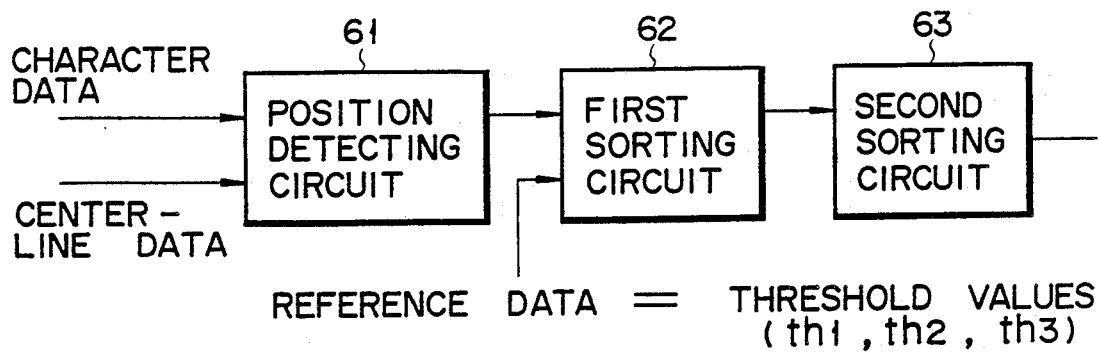
FIG. 13 is a block diagram showing the character sorting circuit used in the apparatus shown in FIG. 9.
Figure 14:
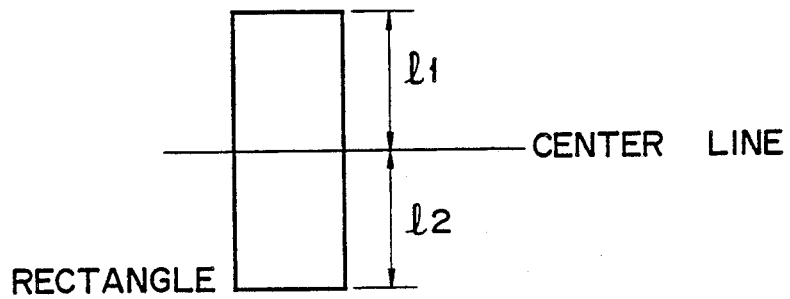
FIG. 14 is a diagram explaining how the distance is detected by which a character is deviated from the center line.

The character sorting circuit 16 is designed to sort the characters into the five categories 1 to 5, in accordance with the positions which the rectangles take with respect to the center line as is illustrated in FIG. 12. More specifically, as is shown in FIG. 13, the circuit 16 comprises a position detecting circuit 61, a first sorting circuit 62, and a second sorting circuit 63. The position detecting circuit 61 finds the difference $\Delta l$ between the heights l1 and l2 of two halves of each character which are above and below the center line, respectively, and supplies the data representing this difference $\Delta l$ to the first sorting circuit 62. A reference value for said difference is also input to the first sorting circuit 62. The first sorting circuit 62 compares $\Delta l$ with the reference value, and sorts the characters into three groups in accordance with the absolute value of $\Delta l$. More precisely, the circuit 62 sorts the characters into the first group consisting of tiny characters of category 1, the second group consisting of small characters of categories 2 and 3, and the third group consisting of large characters of 4 and 5. The second sorting circuit 63 sorts the characters of the second and third groups into categories in accordance with whether the difference $\Delta l$ is nil, positive or negative. When $\Delta l$ is positive, each character is regarded as one belonging to category 2 or 4. When $\Delta l$ is negative, the character is regarded one belonging to category 3 or 5. The circuit 63 sorts the characters in the following scheme:

$$\begin{array}{lll} \Delta l > 0 & \Delta l = 0 & \Delta l < 0 \\ & |\Delta l| \leq th1 & (1) \\ th1 < |\Delta l| \leq th2 & & (2)\text{-}(3) \\ th2 < |\Delta l| \leq th3 & & (4)\text{-}(5) \end{array}$$

In the above table, threshold values, which are input to the second sorting circuit 63, have the relation of $th1 < th2 < th3$.

Figure 15:
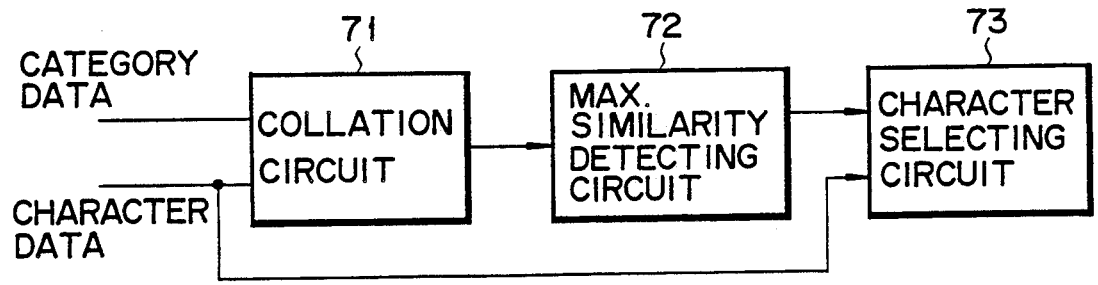
FIG. 15 is a block diagram illustrating the character specifying circuit incorporated in the apparatus shown in FIG. 9.

The embodiment of FIG. 9 further comprises a character specifying circuit 20 connected to the pattern recognizing circuit 17. The circuit 20 is designed to specify the character which is more similar to each input character than any of the other candidate characters selected by the character recognizing circuit 17. As is shown in FIG. 15, the circuit 20 comprises a collation circuit 71, a maximum similarity detecting circuit 72, and a character selecting circuit 73. The collation circuit 71 collates the category data item with each candidate character, and outputs a coincidence signal to the maximum similarity detecting circuit 72 when the candidate character belongs to the category. In response to this signal, maximum similarity detecting circuit 72 detects the maximum similarity for the candidate character, and outputs a maximum similarity signal to the character selecting circuit 73. In response to this signal, the circuit 73 selects the candidate character which is most similar to the input character.

In the embodiment shown in FIGS. 9 to 15, the characters of any row may be found, by means of the pattern matching, to be of less than five categories. If this is the case, it suffices to refer to the dictionary patterns of the character of these few categories.

The isosceles triangle, which represents the position and width of a character is not limited to the histogram formed by adding the function data items. For instance, it can be a histogram representing the vertical axes of the rectangles bordering the extremities of the characters. Alternatively, the isosceles triangle can be one defined by burring the histogram.

Furthermore, in the second embodiment, tiny characters, if any in each row, can be removed, and the inclination of the row, if any, can be eliminated before the center line is defined.

The sorting circuit 16 incorporated in the embodiment of FIG. 9 can be designed to assign two or more categories, not only one category, to each character by adding an attribute or attributes to the character. If this is the case, the character specifying circuit 20 refers to the dictionary patterns of two or more categories, thereby to recognize the character having these attributes.

Also in the second embodiment (FIG. 9), data showing the various categories, into which characters of a specific font can be sorted, can be provided so that the font of any character may be predicted by collating the category of the character with the data. This technique helps to distinguish a character of one font from the same character of any other font.

Also in the second embodiment (FIG. 9), the line space can be determined, it can be determined whether these rows are spaced apart at regular intervals. When they are spaced at regular intervals, it can be assumed that each of these rows includes more characters of one specific category than characters of the other categories. If this is the case, the characters of these rows can be recognized in batch, within a shorter time than in the case where the characters are subjected to the pattern matching, row by row. Moreover, when the reference lines for a row of characters are substantially aligned with those for another row of characters, and the distance between the reference lines for the first row is near equal to the distance between the reference lines for the second row, the characters of these rows can also be recognized in batch, within a shorter time than in the case where the characters are subjected to the pattern matching.

A third embodiment of the invention will now be described with reference to FIG. 16.

As is shown in FIG. 16, this embodiment has an image input circuit 111 which comprises a scanner such as a line image sensor. The circuit 111 reads a document and outputs the document image data. The output of the circuit 111 is connected to the image memory circuit 112. The memory circuit 112 stores the document image data. The output of the memory circuit 112 is connected to the character row extracting circuit 113. The circuit 113 extracts each row of characters from the document image data, in accordance with, for example, the black-run length or the white-run length of the document image data. The output of the circuit 113, i.e., the data representing the row of characters, is supplied to the character separating circuit 114. The circuit 114 separates the characters, one by one, from the row extracted by circuit 13, and outputs data items representing the patterns of these characters and also data items showing the rectangles bordering the extremities of the characters. The data items are input to reference line detecting circuit 115, character sorting circuit 116, and pattern recognizing circuit 117.

The reference line detecting circuit 115 detects or defines reference lines and also the inclination of the row of characters, from the rectangles bordering the extremities of the characters of the row, as will be explained in detail later. The character sorting circuit 116, which is coupled to the reference line detecting circuit 115, sorts the characters of the row into several categories in accordance with the sizes of the rectangles and also with the positions the rectangles take with respect to the reference lines defined by the circuit 115. When the row of characters is inclined, the circuit 116 eliminates the inclination of the row. The output of the circuit 116 is coupled to the pattern recognizing circuit 117. The outputs of the character separating circuit 114, and that of the pattern dictionary 118 are also connected to the circuit 117. The pattern dictionary 118 stores the dictionary patterns of characters sorted in categories. The pattern recognizing circuit 117 compares the character pattern represented by each data item supplied from the character separating circuit 114, with the dictionary character patterns of the same category which have been read from the pattern dictionary 118, and output the data item representing the dictionary pattern which is most similar to the character pattern supplied from the character separating circuit 114. The data item output by the circuit 117 is supplied to the output circuit 119.

The reference line detecting circuit 115 and the character sorting circuit 116 will now be described in greater detail.

Figure 17:
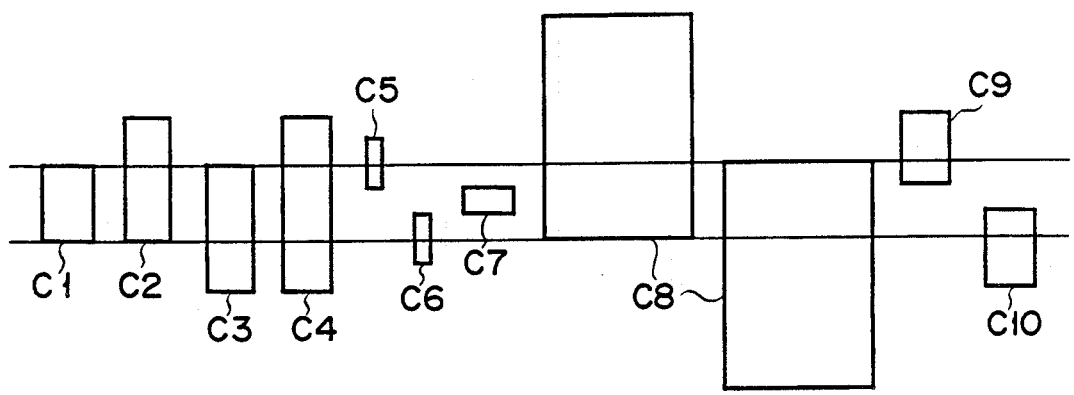
FIG. 17 shows rectangles of various sizes, which border the extremities of the characters which have been sorted into several categories in accordance with their position with respect to reference lines, and which are to be recognized.

The circuits 115 and 116 cooperate to sort the characters of each row into ten categories. More specifically, as is shown in FIG. 17, the characters are sorted into the first category of standard characters C1, the second category of ascender characters C2, the third category of descender characters C3, the fourth category of tall characters C4 each having upper and lower ends projecting above the upper reference line and below the lower reference line, respectively, the fifth category of tiny superscripts C5, the sixth category of tiny subscripts C6, the seventh category of central tiny characters C7, the eighth category of huge characters C8, the ninth category of superscripts C9, and the tenth category of subscripts C10.

Figure 18:
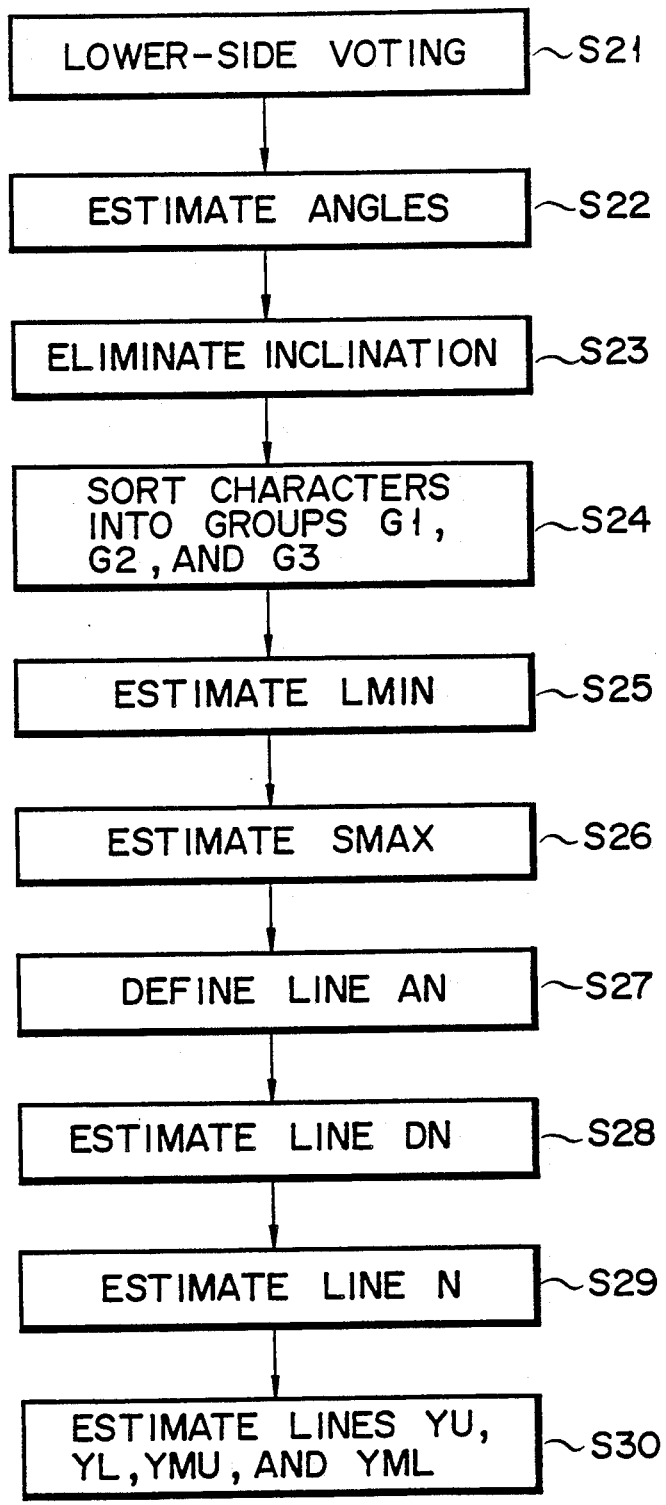
FIG. 18 is a flow chart explaining the operation of the reference line detecting circuit incorporated in the apparatus shown in FIG. 16.

The reference line detecting circuit 115 defines two reference lines from the rectangles bordering the extremities of the characters of each row, as will be explained with reference to the flow chart of FIG. 18.

Figure 19:
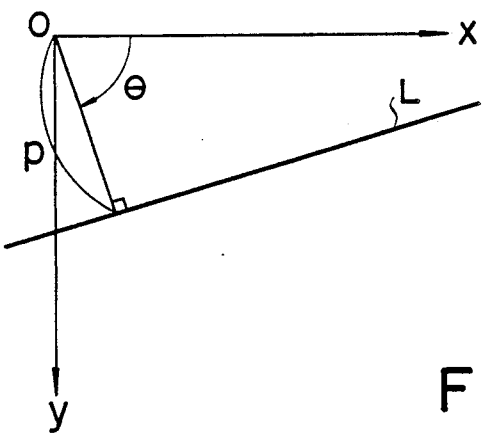
FIG. 19 is a diagram indicating the relationship between X-Y coordinates and $\theta\rho$ coordinates, which are used in the Hough transform.

First, in step S21, the circuit 115 detects the lower-left corners of the rectangles (hereinafter called "representative points"), and obtains the parameters defining the straight lines passing these corners. As is shown in FIG. 19, the set of parameters ($\sigma$, $\rho$) defining a given line L shown in FIG. 19 are given as follows:

$$\rho = x \cos\theta + y \sin\theta \quad (\theta : 0 < \theta < 2\pi)$$

Parameters $\theta$ and $\rho$ define parameter space. The values of $\theta$ and $\rho$ are calculated for the respective point of each rectangle, thereby obtaining the coordinates of a new point in the parameter space. In other words, Hough voting is performed. If the value of $\theta$ is limited to a narrow range, the amount of calculation is small. For example, if the row of character extends almost horizontally, $\theta$ will be close to $\pi/2$.

When the parameters defining the lines passing the representative points of all characters forming one row have been obtained, the frequency of the point in the parameter space, which is defined by the parameters of a given line, is equal to the number of the representative points which given line passes. Hence, the more presentative points any line passes, the higher frequency the corresponding point in the parameter space has.

Figure 20A:
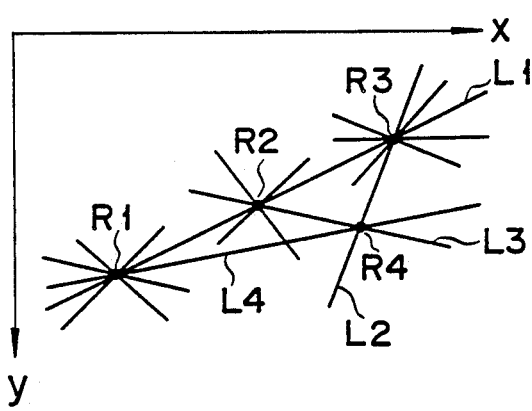
FIGS. 20A and 20B show curves existing in the X-Y coordinates and the $\theta\rho$ coordinates.
Figure 20B:
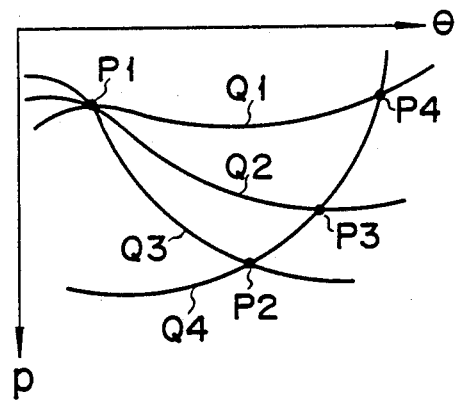

FIGS. 20A and 20B illustrate how the Hough voting is achieved. FIG. 20A shows the representative points R1 (x1, y1), R2 (x2, y2), R3 (x3, y3), and R4 (x4, y4) of some rectangles, and also straight lines passing these points. FIG. 20B shows curves Q1, Q2, Q3, and Q4 which are defined by the straight lines passing points R1, R2, R3, and R4. When these curves Q1 to Q4 are obtained for representative points R1 to R4, all in the x-y space, points P1, P2, and P3 will be identified where curves Q1 to Q4 intersect with one another. This reveals that the x-y space contains lines each passing two more of points R1 to R4. When two curves cross each other at a point in the $\theta$-$\rho$ parameter space (FIG. 20B), the x-y space (FIG. 20A) must contain a line which passes two representative points. Also, when three curves cross each other at a point in the $\theta$-$\rho$ parameter space (FIG. 20B), the x-y space (FIG. 20A) must contain a line which passes three representative points.

In the case represented in FIGS. 20A and 20B, three curves Q1, Q2 and Q3 intersect at point P1 in the $\theta$-$\rho$ parameter space, and line L1 passes three representative points R1, R2, and R3 in the x-y space. In the $\theta$-$\rho$ parameter space (FIG. 20B), curve Q4 intersects with curves Q3, Q2, and Q1 at points P2, P3, and P4, respectively. As is shown in FIG. 20A, the x-y space contains three lines L2, L3, and L4—line L2 passing points R1, R2, and R3, line L3 passing points R2 and R4, and line L4 passing points R1 and R4.

In summary, when the x-y space contains a line which passes many representative points, the $\theta$-$\rho$ parameter space contains a point in which many curves intersect with one another.

Then, in step S22, the reference line detecting circuit 115 estimates angle $\theta$ at which the row of characters is inclined in the coordinate system, and also the position of a base line. Generally, the line which is inclined at the same angle as the row of characters is considered to pass more representative points than any other line. Hence, the inclination of the character row can be estimated by finding the angle $\theta$ of such a line which passes the point contained in the $\theta$-$\rho$ parameter space and having the higher frequency than any other point.

Figure 21:
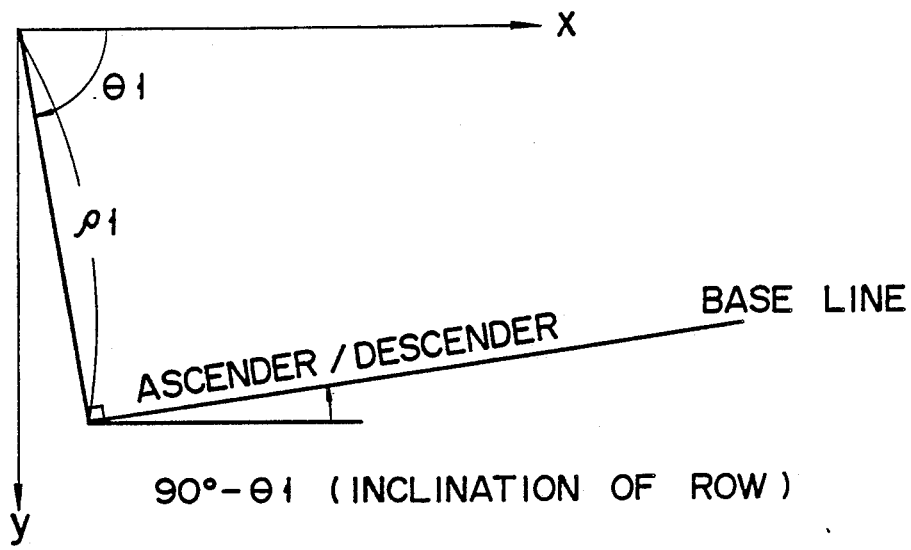
FIG. 21 is a diagram explaining how to determine the inclination of a row of characters.

In the case of a document written in English, the most frequently used ascender character has its lowest extremity located at the same level as the lowest extremities of the standard-size characters. For this reason, the Hough voting is carried out, first for the lower sides of the rectangles bordering the extremities of the characters. In the instance shown in FIGS. 20A and 20B, point P1 has the highest frequency since three curves intersect at this point. Hence, from the coordinates of point P1, i.e., ($\theta$1, $\rho$1), the inclination of the character row can be obtained, and the base line can be defined. FIG. 21 shows the relationship between the inclination and the base line.

In the next step, S23, the rectangle bordering the extremities of each character is shifted vertically by the distance between horizontal line and the character. Hence, the characters are arranged in the horizontal line, whereby a horizontal (not inclined) row of characters is obtained.

In step S24, the characters, which have been vertically shifted, thus eliminating the inclination of the row, are sorted into three groups G1, G2, and G3, in accordance with the heights of the rectangles and the positions of the upper and lower sides of the rectangles. Group G1 includes characters whose lower extremities are located above the base line, group G2 includes characters whose lower extremities are located on the base line, and group G3 includes characters whose lower extremities are located below the base line. Hence, group G1 includes tiny superscripts, central tiny characters, and superscripts; group G2 includes standard-size characters, ascender characters, some tiny subscripts, and huge characters; and group G3 includes descender characters, tall characters, the remaining tiny subscripts, huge characters, and subscripts.

Figure 23:
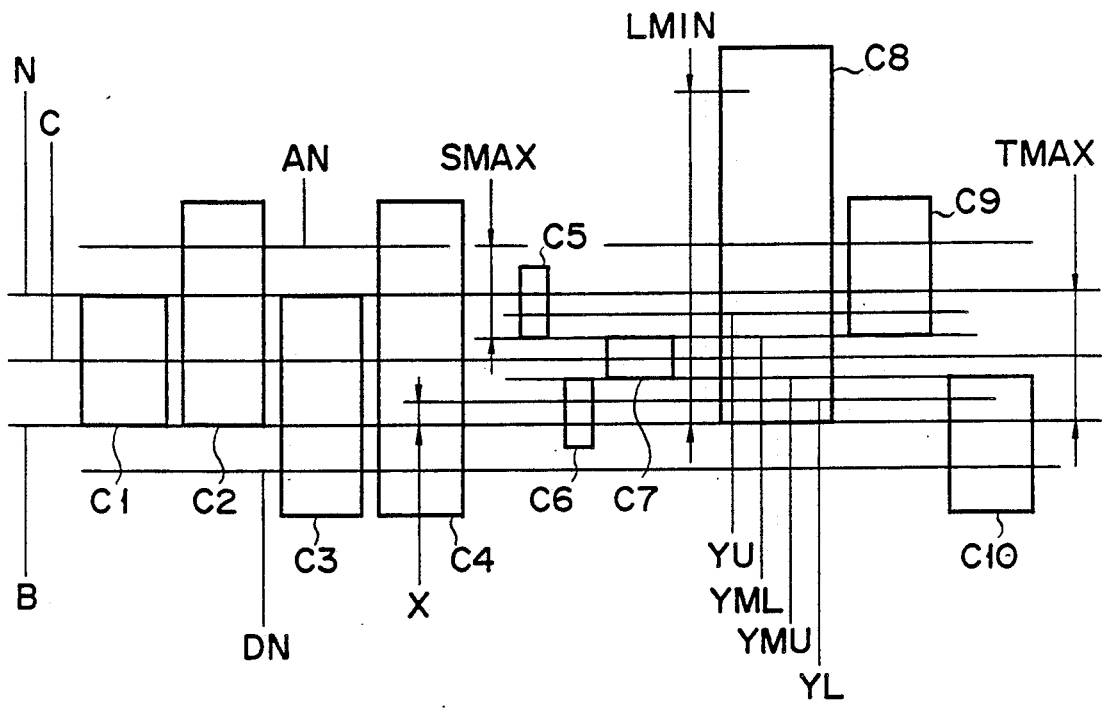
FIG. 23 illustrates the positional relationship between various reference lines, one the one hand, and the characters of various categories, on the other.

Further, in step S25, the average height of the characters of group G2 is calculated. Height LMIN, which is a% of the average height (a > 100), is used as the minimum value for the heights of huge characters, as is shown in FIG. 23. Hence, any character whose height is equal to or greater than LMIN will be recognized as a huge character.

Then, in step S26, the average height of all characters of group G2, except for the huge characters, is obtained. Height SMAX, which is b% of this average height (b > 100), is used as the maximum value for the heights of tiny characters, as is illustrated in FIG. 23. Therefore, any character whose height is equal to or less than SMAX will be recognized as a tiny character.

Thereafter, in step S27, all characters of group G2, except for the huge characters and the tiny characters, are sorted into ascender ones and descender ones. More precisely, the average height of these characters is obtained. Then, the position of the upper side of a rectangle having this average height is determined. The horizontal line which aligns with the upper side of this rectangle is used as a reference line AN (see FIG. 23). Any character whose upper extremity is located above the reference line AN is recognized as an ascender character, and any character whose upper extremity is located in or below the line AN is recognized as a descender characters. When the character of the row are neither huge ones nor tiny ones, and are of the same category, the reference line AN defines the positions of the upper extremities of these characters.

In the next step, S28, the positions of the lower sides of the rectangles corresponding to all characters of group 3, except the huge ones and the tiny ones, are detected. Then, the rectangle whose lower side is at the highest position is determined. The horizontal line passing a point which is located exactly halfway between the base line B and the lower side of this rectangle is used as a reference line DN for distinguishing the standard-size characters from the descender characters, as can be understood from FIG. 23. When the row includes no characters of group 3 except huge and tiny ones, the line DN defines the positions of the lower extremities of these characters.

Then, in step S29, all characters of group G2, but the huge ones and the tiny ones, the upper extremities of which are located below the reference line AN, are selected. Of these selected characters, those having upper extremities at the same level and being greater in number than any others having upper extremities at the identical level are selected. The horizontal line passing the upper extremities of these characters is used as a reference line N for distinguishing the standard-size characters from those of any other category, can be evident from FIG. 23. The distance TMAX between the line N and the base line B is detected.

In step S30, as is shown in FIG. 23, horizontal lines YU and YL are defined, the former passing a point located below the line N and set apart therefrom by distance X which is c% of TMAX (c<100) and the latter passing a point located above the line N and set apart therefrom by distance X. Also, the horizontal line passing the point exactly halfway between the reference line N and the base line B is used as the center line C for the row of characters. Still further, two horizontal lines YMU and YML are defined, the former passing a point located below the center line C and set apart therefrom by distance X, and the latter passing a point located above the center line C and set apart therefrom by distance X.

Thus, the reference detecting circuit 115 defines a variety of reference lines, all being shown in FIG. 23.

Figure 22:
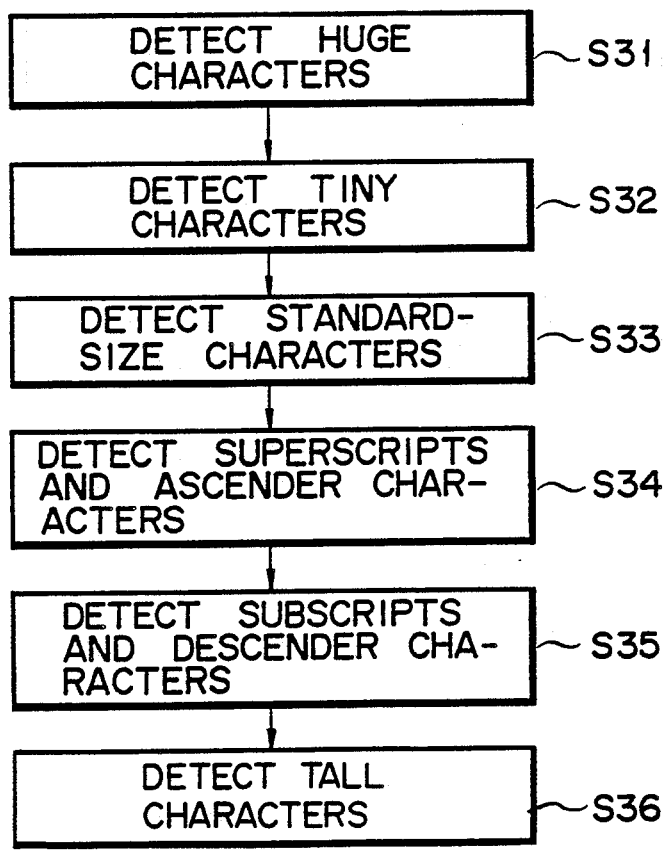
FIG. 22 is a flow chart explaining how characters are sorted in the apparatus shown in FIG. 16.

It will now be explained how the character sorting circuit 116 operates, with reference to FIG. 22 (flow chart) and FIG. 23.

The circuit 116 sorts the characters of each row into various categories, in accordance with heights LMIN and SMAX, and the six, i.e., AN, DN, YU, YL, YMU, and YLM, of the nine reference lines which the circuit 115 has defined. First, in step S31, any input character whose height is equal to or greater than LMIN is classified as a huge character. In the next step S32, any input character, except for the huge ones, whose height is equal to or less than SMAX is sorted as a tiny character. The tiny characters are sorted into three categories, i.e., tiny superscripts, tiny subscripts, and tiny central characters, in the following scheme:

I. Any tiny character is recognized as a superscript if its upper and lower extremity are located above the lines YU and YMU, respectively.

II. Any tiny character is recognized as a subscript if its upper and lower extremity are located below the lines YML and YL, respectively.

III. Any tiny character is recognized as a central tiny one unless the positions of its upper and lower extremities meet the condition I or II.

Next, in step S33, any character, which has been recognized neither as a huge one in step S31 nor as a tiny one in step S32, is sorted as a standard-size character if its upper and lower extremities are located in or below the line AN and in or above the line DN, respectively. When the line AN passes the upper extremity of the tallest character of the row, it is impossible to determine whether the character is a standard-size one or an ascender character. In this case, the pattern recognizing circuit 117, which is coupled to the character sorting circuit 116, collates the character with the dictionary patterns of standard-size characters and ascender characters, which have been read from the pattern dictionary 118, thereby to recognize the character as a standard-size one or as an ascender character.

Further, in step S34, any character, which has not been recognized as a huge one in step S31, or as a tiny one in step S32, or as a standard-size one in step S33, is sorted as either an ascender character or a subscript if its upper extremity is located above the line AN and its lower extremity is located in or above the line DN, in the following scheme:

I. Any character, except for a huge one, a tiny one, and a standard-size one, is recognized as a superscript if its lower extremity is located above the line YMU.

II Any character, except for a huge one, a tiny one, and a standard-size one, is recognized as an ascender character if its lower extremity is located either in or below the line YMU.

Next, in step S35, any character of the row, which has not been sorted in step S31, S32, S33, or S34, and whose upper extremity is located in or below the line AN and whose lower extremity is located below the line DN, is recognized either as a descender character or as a subscript, in the following scheme:

I. Any character of this type is recognized as a subscript if its upper extremity is located below the line YML.

II. Any character of this type is recognized as a descender character if its upper extremity is located either in or above the line YML.

Finally, in step S36, any character of the row, which has not been sorted in step S31, S32, S33, S34 or S35, and whose upper extremity is located above the line AN and whose lower extremity is located below the line DN, is recognized as a tall character.

As has been described, the character sorting circuit 116 sorts the characters of each row into the ten categories which have been specified above.

The data items representing the categories of the characters, and the data representing the inclination of the character row are supplied from the character sorting circuit 116 to the pattern recognizing circuit 117. The circuit 117 compares the character pattern represented by each data item supplied from the character separating circuit 114, with the dictionary character patterns of only the category identified by the data item outputs by the circuit 116, and output the data item representing the dictionary pattern which is most similar to the character pattern supplied from the circuit 114. The data item output by the circuit 117 is supplied to the output circuit 119.

The following is a list exemplifying the character of each category:
Standard-size: [a], [c], [e], [:], [;], etc.
Ascender: [A], [B], [b], [f], [5], [?], [%] etc.
Descender: [g], [j], [p], [q], [y], etc.
Tall: [/], [(], [)], etc.
Tiny super: ["], ['], etc.
Tiny sub: [.], [,], etc.
Tiny Central: [-], [ ], etc.
Huge: Symbols extending over lines
Superscript: [²], [ᵃ], [⁺], etc.
Subscript: [₃], [ₓ], [ᵧ], etc.

As been described, in the third embodiment shown in FIG. 16, the characters of each row are sorted into several categories in accordance with their positions and sizes. Hence, it suffices to compare the pattern of each character with the dictionary patterns of the same category, whereby the pattern matching process can be carried out faster. Further, identical characters of different fonts can be recognized, only if the patterns of these characters are stored in the dictionary 118 and indexed to the categories.

In the third embodiment, the histogram of the parameter space can be used for detecting the inclination of each row of characters. It can be used, not only for sorting characters, but also for other purposes. Moreover, the line space can be determined by a distance between the adjacent base lines. When the rows of characters are spaced at regular intervals, it can be assumed that each of these rows includes more characters of one specific category than characters of the other categories. If this is the case, the characters of these rows can be recognized in batch, within a shorter time than in the case where the characters are subjected to the pattern matching, row by row. Moreover, when the base line for a row of characters is substantially aligned with that for another row, and the distance between these base lines is substantially nil, the characters of these rows can also be recognized in batch, within a shorter time than in the case where these rows of characters are subjected to separate pattern matching processes.

Still further, the third embodiment can recognize two or more adjacent rows of characters at a time. In this case, the angle $\theta$ for the next Hough voting can be estimated from the average inclination of these adjacent rows. This also serves to reduce the time for character recognition.

In addition, it is possible with the third embodiment to conduct the Hough voting on the upper sides of the rectangles bordering the extremities of the characters, after defining the base line. This method can define the other reference lines, even if the inclination of the character row has not yet been eliminated.

Figures 24A, 24B:
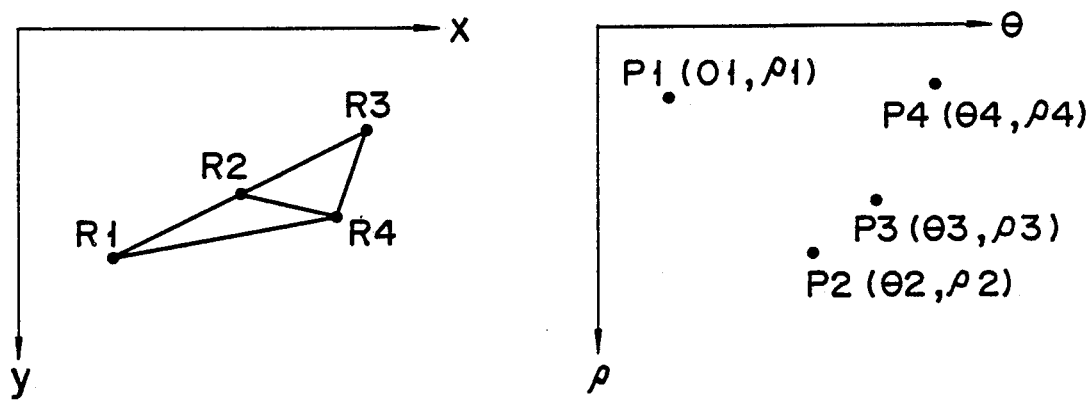
FIGS. 24A and 24B are diagrams explaining methods of transforming parameters, other than the Hough transform.

In the third embodiment, a histogram is formed in the parameter space, with regard to the sets of parameters which define the straight lines passing the representative point of each character. Instead, any other parameter transform can be employed, and the mathematical processes can be effected in any different order. For instance, as is shown in FIG. 24A, $(n-1)/2$ lines R1, R2, R3, R4, ... Rn−1, and Rn, which connect representative points R1, R2, R3, ... Rn, i.e., the lower-left corners of the rectangles bordering the extremities of characters are defined, and the sets of parameters $(\theta, \rho)$ of these lines are calculated. The sets of parameters are voted in the $\theta$-$\rho$ parameter space, at points P1, P2, P3, ..., as is illustrated in FIG. 24B. The parameter set of the highest frequency, i.e., P1 $(\theta 1, \rho 1)$ in this instance, is detected, thereby to define a base line.

As has been described, the lower-left corners of the rectangles are used as representative points. This is because many letters of the English alphabet are handwritten slantwise, upward to the right. Needless to say, any other corner of each rectangle can be used as the representative point. Further, the lowest extremity of each character, or the lowest point in a circle bordering the extremities of each character can be used as the representative point.

As has been described, according to the present invention, rows of characters are extracted from document image data, characters are separated from each row, and a histogram is formed in a parameter space, with respect to the sets of parameters, each set representing the lines passing a specified point of each character. Then, the line defined by the parameter set of the highest frequency is used as a reference line, and the inclination of this line is detected. Therefore, the character recognition apparatus according to the invention need not be provided with a sophisticated image input means in order to collect image data such as rows of characters. Since the inclination of a character row can be detected from a relatively small amount of image data, the cost of character recognition is low. In addition, the inclination of the character is accurate since it is determined by the parameter set having a higher frequency than any other set in the parameter space.

What is claimed is:

1. A character recognition apparatus comprising:
   document data input means for inputting document data representing at least one row of characters;
   character separating means for extracting the row of characters from the document data input by said document data input means and separating the characters;
   histogram forming means for forming a histogram pertaining to a predetermined position of each of the characters of the row of characters which said character separating means has extracted from the document data;
   reference line defining means for defining a reference line from the histogram formed by said histogram forming means;
   character sorting means for sorting the characters into a plurality of categories in accordance with the positional relation between the characters and the reference line defined by said reference line defining means; and
   character recognizing means for recognizing the characters sorted by said character sorting means, using dictionary patterns of a category corresponding to the sorted characters.

2. The apparatus according to claim 1, wherein said histogram forming means forms the histogram pertaining to upper and lower positions of each of the characters of the row of characters, said reference line defining means includes means defining two reference lines corresponding to the upper and lower positions from the histogram, and said character sorting means includes means for sorting the characters in accordance with the sizes of the characters and the positions of the characters with respect to the two reference lines.

3. The apparatus according to claim 2, wherein said characters include tiny characters, standard-size characters, and nonstandard-size characters; and reference line defining means includes means for forming a histogram pertaining to upper and lower positions of each of the characters, except for the tiny characters, and means for defining said reference lines from this histogram.

4. The apparatus according to claim 3, wherein said reference line defining means has means for detecting tiny characters, and means for discriminating the tiny characters, which said detecting means has detected erroneously.

5. The apparatus according to claim 2, wherein said reference line defining means includes means for detecting the inclination of the row of characters, and means for eliminating the inclination of the row of characters.

6. The apparatus according to claim 1, wherein said character sorting means sorts said characters into a group of tiny characters, a group of standard-size characters, and a group of any other characters.

7. The apparatus according to claim 6, wherein said character sorting means sorts said characters into superscripts, subscripts, and central characters, in accordance with the positions which these characters take with respect to said two reference lines.

8. The apparatus according to claim 6, wherein said character sorting means sorts said characters into ascender characters, descender characters, and tall characters, in accordance with the lengths of those portions of the characters which project above and below said reference lines.

9. The apparatus according to claim 1, wherein said character separating means outputs data items representing rectangles bordering the extremities of said characters, and said reference line defining means comprises center-line detecting means including data-converting means for each of the rectangle into a function data item representing the position and height of the character corresponding to the rectangle, means for forming a histogram from the function data items output by said data-converting means, and means for detecting the peak of the histogram, thus defining a center line from the peak, and outputting data representing the center line, to said character sorting means.

10. The apparatus according to claim 9, wherein said character sorting means sorts the characters into a plurality of groups in accordance with the difference in the height of the rectangles.

11. The apparatus according to claim 9, wherein said character sorting means sorts the characters of each group into a plurality of categories in accordance with the signs of the differences in the height of the rectangles.

12. A character recognition apparatus comprising:
document data input means for inputting document data representing a plurality of rows of characters including tiny characters, standard-size characters, and characters of other sizes;
character separating means for extracting each of the rows of characters from the document data input by said document data input means and separating the characters of each of the rows;
histogram forming means for forming a histogram pertaining to at least two predetermined positions of each of the rows of characters which said character separating means has extracted from the document data;
reference line defining means for defining two reference lines corresponding to the two positions from the histogram formed by said histogram forming means;
character sorting means for sorting the characters into tiny characters, standard-size characters, and characters of other sizes in accordance with the sizes of the characters and the positions of the characters with respect to the two reference lines defined by said reference line defining means; and
character recognizing means for recognizing the characters sorted by said character sorting means, by comparing the patterns of these characters with dictionary patterns, wherein said histogram forming means forms a histogram pertaining to all characters of each row, except for the tine ones.

13. A character recognition apparatus comprising:
document data input means for inputting document data representing a plurality of rows of characters including tiny characters, standard-size characters, and characters of other sizes.
character separating means for extracting each of the rows of characters from the document data input by said document data input means and separating the characters of each of the rows;
histogram forming means for forming a histogram pertaining to at least two predetermined positions of each of the rows of characters which said character separating means has extracted from the document data;
reference line defining means for defining two reference lines corresponding to the two positions from the histogram formed by said histogram forming means;
character sorting means for sorting the characters into tiny characters, standard-size characters, and characters of other sizes in accordance with the sizes of the characters and the positions of the characters with respect to the two reference lines defined by said reference line defining means;
character recognizing means for recognizing the characters sorted by said character sorting means, by comparing the patterns of these characters with dictionary patterns; and
a pattern dictionary storing the dictionary patterns sorted in various categories, said pattern dictionary being so designed to output the patterns of characters of any category for comparison with any character of the same category.

14. A character recognition apparatus comprising:
document data input means for inputting document data representing at least one row of characters;
character separating means for extracting the row of character from the document data input by said document data input means, and separating the characters from the row; and
reference line defining means for simulating straight lines passing specific points of the characters separated from the row, forming a histogram pertaining to the characters in a parameter space define by the coordinates parameters defining the straight lines, detecting, as a reference line, the straight line defined by a coordinates parameter corresponding to the peak of the histogram, and detecting the inclination of this reference line, wherein said reference line detecting means detects the reference line by means of the Hough voting.

15. A character recognition apparatus comprising:
document data input means for inputting document data representing at least one row of characters including tiny characters, standard-size characters, and nonstandard-size characters;

character separating means for extracting the row of characters from the document data input by said document data input means and separating the characters;

first histogram forming means for forming a first histogram pertaining to the row of characters which said character separating means has extracted from the document data;

reference line defining means including means for detecting two peaks of said histogram and defining two first reference lines from these peaks, means for detecting the tiny characters on the basis of the first reference lines, and second histogram forming means for forming a second histogram of all characters, except for the tiny characters, and means for defining two second reference lines from the peaks of this second histogram;

character sorting means for sorting the characters into a plurality of categories in accordance with the positional relation between the characters and the second reference lines; and character recognizing means for recognizing the characters sorted by said character sorting means, using dictionary patterns of a category corresponding to the sorted characters.

16. The apparatus according to claim 15, wherein said reference line defining means has means for recognizing the tiny characters which have been detected erroneously by said tiny character detecting means, and said second histogram forming means forms the second histogram again, in response to the recognition of the tiny characters detected erroneously.

* * * * *